United States Patent
Ikeda

(10) Patent No.: US 9,501,248 B2
(45) Date of Patent: Nov. 22, 2016

(54) INFORMATION PROCESSING APPARATUS AND RECORDING MEDIUM

(71) Applicant: FUJI XEROX CO., LTD, Minato-ku, Tokyo (JP)

(72) Inventor: Kentaro Ikeda, Kanagawa (JP)

(73) Assignee: FUJI XEROX CO., LTD, Tokyo (JP)

( * ) Notice: Subject to any disclaimer, the term of this patent is extended or adjusted under 35 U.S.C. 154(b) by 389 days.

(21) Appl. No.: 14/263,655

(22) Filed: Apr. 28, 2014

(65) Prior Publication Data

US 2015/0046663 A1  Feb. 12, 2015

(30) Foreign Application Priority Data

Aug. 6, 2013  (JP) ................. 2013-163262

(51) Int. Cl.
| | |
|---|---|
| *G06F 3/12* | (2006.01) |
| *G06F 11/34* | (2006.01) |
| *G06F 3/00* | (2006.01) |
| *H04N 1/00* | (2006.01) |
| *G06K 15/00* | (2006.01) |
| *G06F 13/00* | (2006.01) |

(52) U.S. Cl.
CPC ........... *G06F 3/1207* (2013.01); *G06F 3/1273* (2013.01); *G06F 3/1284* (2013.01); *G06F 11/3476* (2013.01); *G06F 13/00* (2013.01); *G06K 15/40* (2013.01); *H04N 1/00* (2013.01); *G06K 15/002* (2013.01)

(58) Field of Classification Search
CPC .... G06F 3/1207; G06F 13/00; G06F 3/1284; G06F 3/1273; G06F 11/3476; G06K 15/40; G06K 15/002; H04N 1/00
See application file for complete search history.

(56) References Cited

U.S. PATENT DOCUMENTS

| | | | | |
|---|---|---|---|---|
| 6,052,760 A | * | 4/2000 | Bauman | G06F 12/0817 711/119 |
| 2004/0111557 A1 | * | 6/2004 | Nakatani | G06F 11/1435 711/113 |
| 2004/0168058 A1 | * | 8/2004 | Margolus | G06F 17/30368 713/158 |
| 2005/0257275 A1 | * | 11/2005 | Ooba | H04N 1/00854 726/28 |
| 2016/0070483 A1 | * | 3/2016 | Yoon | G06F 13/1689 711/154 |

FOREIGN PATENT DOCUMENTS

| | | |
|---|---|---|
| JP | 04-307641 A | 10/1992 |
| JP | 7319816 A | 12/1995 |
| JP | 2009-015425 A | 1/2009 |

OTHER PUBLICATIONS

Communication dated Apr. 12, 2016 from the Japanese Patent Office in counterpart application No. 2013-163262.

* cited by examiner

*Primary Examiner* — Michael Alsip
(74) *Attorney, Agent, or Firm* — Sughrue Mion, PLLC

(57) ABSTRACT

An information processing apparatus includes a first controller, a second controller, a non-volatile storage medium, and a volatile storage medium. The non-volatile storage medium is able to store data under control by the first controller, and unable to store data under control by the second controller. The volatile storage medium is able to store data under control by the second controller such that the data are readable therefrom under control by the first controller. The second controller includes a first storage unit that stores history data of operation performed under control by the second controller in the volatile storage medium. The first controller includes a reading unit and a second storage unit. The reading unit reads the history data stored in the volatile storage medium by the first storage unit. The second storage unit stores the history data read by the reading unit in the non-volatile storage medium.

4 Claims, 5 Drawing Sheets

INFORMATION PROCESSING APPARATUS AND RECORDING MEDIUM

CROSS-REFERENCE TO RELATED APPLICATIONS

This application is based on and claims priority under 35 USC 119 from Japanese Patent Application No. 2013-163262 filed Aug. 6, 2013.

BACKGROUND

Technical Field

The present invention relates to an information processing apparatus and a recording medium.

SUMMARY

According to an aspect of the present invention, there is provided an information processing apparatus including: a first controller; a second controller; a non-volatile storage medium provided to be able to store data under control by the first controller and provided to be unable to store data under control by the second controller; and a volatile storage medium which is provided to be able to store data under control by the second controller and from which the data are readable under control by the first controller, in which the second controller includes a first storage unit that stores history data of operation performed under control by the second controller in the volatile storage medium, and the first controller includes a reading unit that reads the history data stored in the volatile storage medium by the first storage unit, and a second storage unit that stores the history data read by the reading unit in the non-volatile storage medium.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described in detail below with reference to the drawings.

Figure 1:
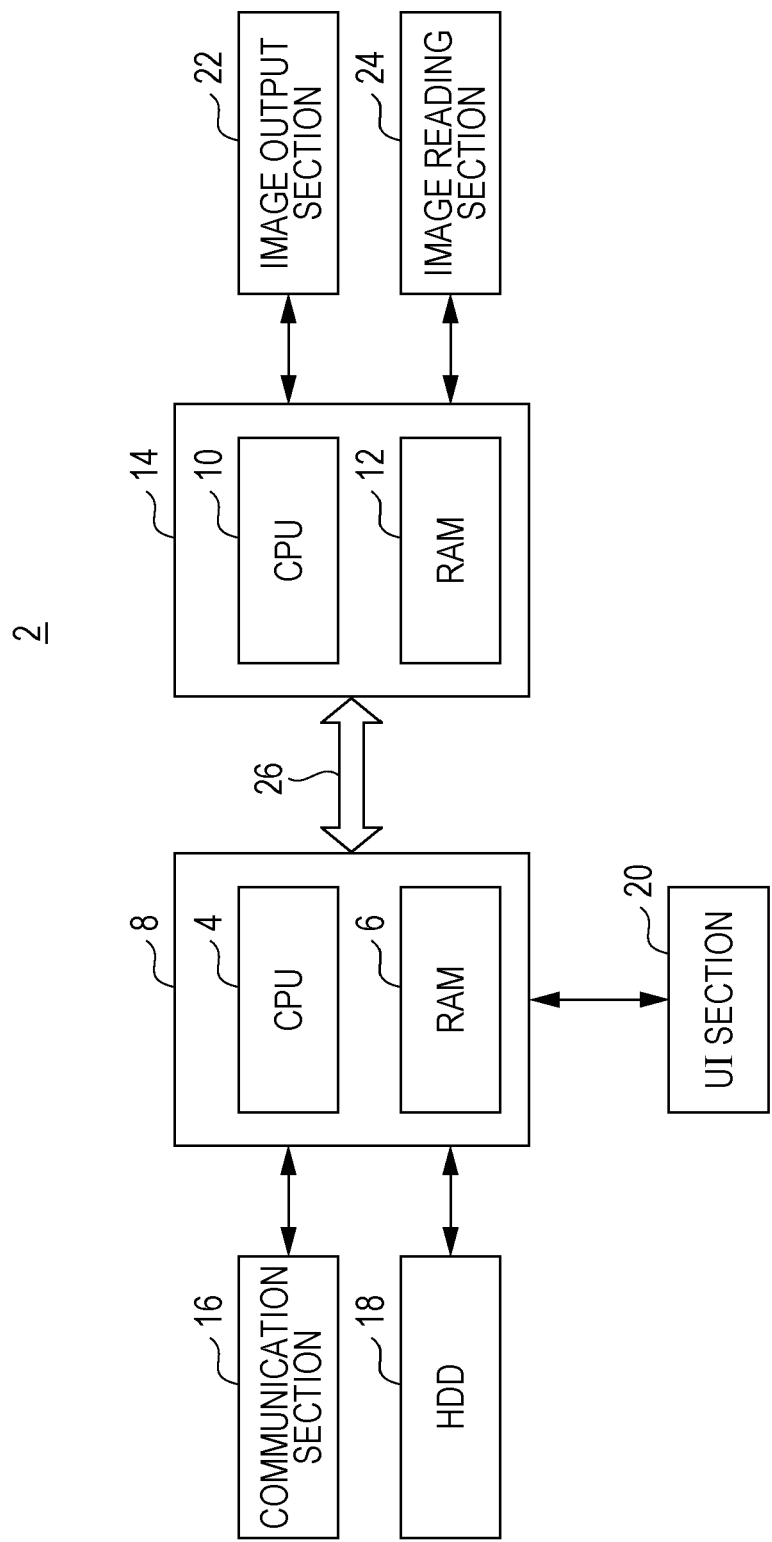
FIG. 1 is a schematic diagram illustrating the hardware configuration of an image forming apparatus 2 which is an example of an information processing apparatus according to an exemplary embodiment of the present invention.

FIG. 1 is a schematic diagram illustrating the hardware configuration of an image forming apparatus 2 which is an example of an information processing apparatus according to an exemplary embodiment of the present invention. As illustrated in FIG. 1, the image forming apparatus 2 includes two central processing units (CPUs). The image forming apparatus 2 includes a first system (first controller) 8 including a CPU 4 and a random access memory (RAM) 6 which is a volatile storage medium, and a second system (second controller) 14 including a CPU 10 and a RAM 12 which is a volatile memory. In addition, the image forming apparatus 2 includes a communication section 16, a hard disk drive (HDD) 18 which is a non-volatile storage medium, a user interface (UI) section 20, an image output section 22, and an image reading section 24.

The first system 8 is a controller in which a general-purpose operating system (OS) operates. The second system 14 is a controller in which a real-time OS (RTOS) operates.

In the first system 8, the CPU 4 executes a process on the basis of a program stored in the RAM 6. The program may be provided to the CPU 4 as stored in a storage medium such as a CD-ROM, or may be provided to the CPU 4 via a network (not illustrated).

In the exemplary embodiment, the first system 8 is a controller that mainly performs input and output processes for a user. The communication section 16, the HDD 18, and the UI section 20 are connected to the first system 8. The second system 14 may not utilize the HDD 18.

In the second system 14, the CPU 10 executes a process on the basis of a program stored in the RAM 12. The program may be provided to the CPU 10 as stored in a storage medium such as a CD-ROM, or may be provided to the CPU 10 via a network (not illustrated).

In the exemplary embodiment, the second system 14 is a controller that controls devices such as the image output section 22 and the image reading section 24. The image output section 22 and the image reading section 24 are connected to the second system 14. At least a part of a storage area of the RAM 12 provided in the second system 14 is configured as a shared storage area that may be referenced by the first system 8 and the second system 14. In the exemplary embodiment, data may be written into and read from the shared storage area of the RAM 12 under control by any of the first system 8 and the second system 14. For the configuration of the RAM 12, however, it is only necessary that data may be stored in the RAM 12 under control by the second system 14, and that the data, which have been stored under control by the second system 14, may be read under control by the first system 8.

The communication section 16 is an interface that transmits and receives data to and from external devices via a network (not illustrated).

The HDD 18 is an example of a non-volatile storage medium. The HDD 18 is provided to be able to store data under control by the first system 8, but is provided to be unable to store data under control by the second system 14. In the exemplary embodiment, the HDD 18 is provided as an example of a non-volatile storage medium provided to be able to store data under control by the first system 8 and provided to be unable to store data under control by the second system 14. However, the non-volatile storage medium is not limited to an HDD, and may be a solid-state drive (SSD), a non-volatile memory, or the like.

The UI section 20 is configured as a touch panel, for example, and receives an input operation from the user and displays information on a screen.

The image output section 22 is a printer that prints and outputs an image based on image data acquired via the communication section 16. The image output section 22 may output image data read by the image reading section 24.

The image reading section 24 is a reading device such as a scanner that reads an image from a document.

A communication passage 26 is provided between the first system 8 and the second system 14 to transmit and receive data between the first system 8 and the second system 14 through a data transfer interface such as a PCI Express.

With the configuration illustrated in FIG. 1, in the case where the image forming apparatus 2 performs print operation, for example, a print job is transmitted from the user via the communication section 16, and the first system 8 receives the print job. Image data contained in the print job are transferred to the second system 14 side via the communication passage 26, and the second system 14 controls the image output section 22 so as to print the image data on paper.

Figure 2:
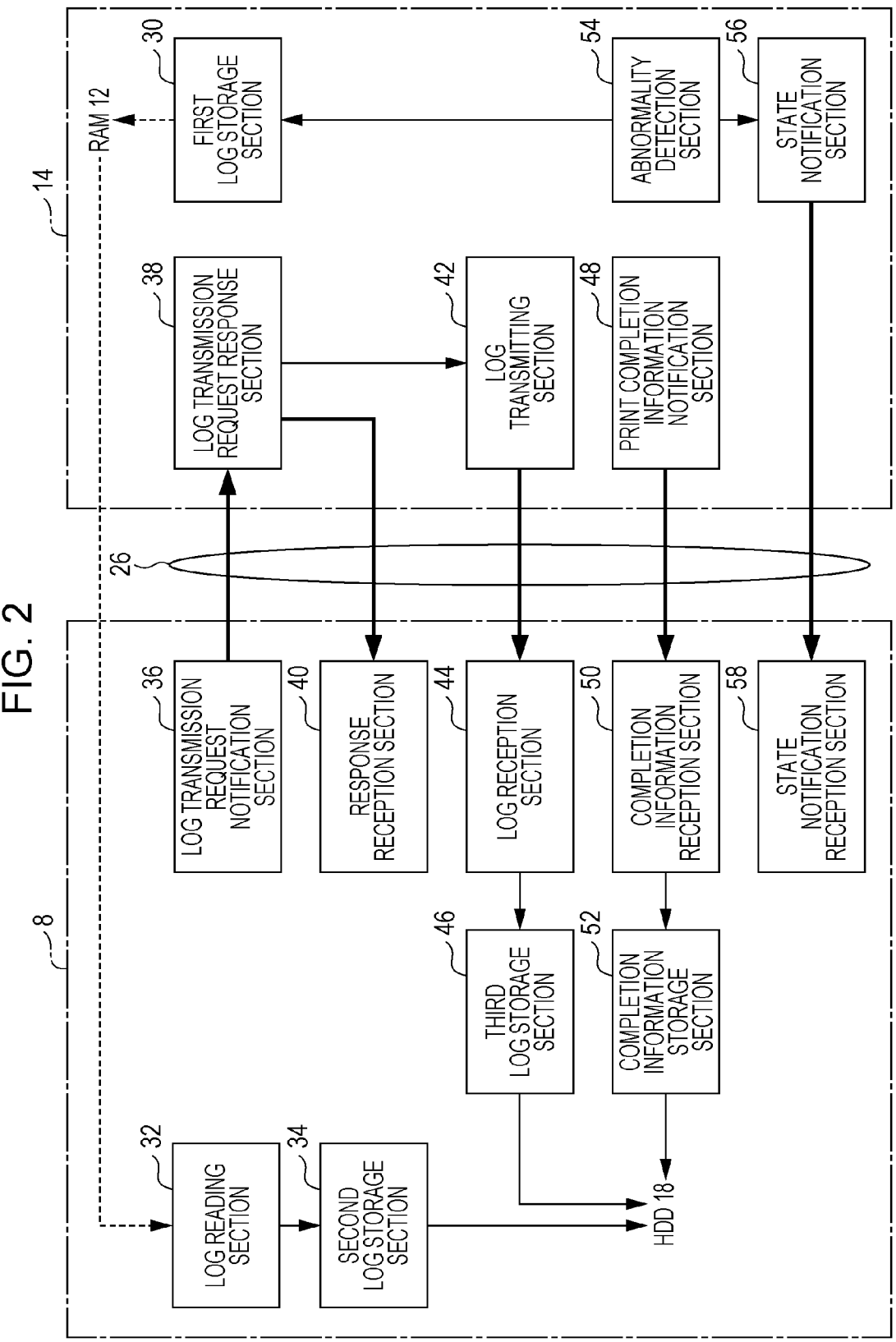
FIG. 2 is a block diagram illustrating the functional configuration of the image forming apparatus 2 implemented by a program executed by a first system 8 and a second system 14.

FIG. 2 is a block diagram illustrating the functional configuration of the image forming apparatus 2 implemented by a program executed by the first system 8 and the second system 14. In FIG. 2, the broken arrows indicate processes for writing into and reading from the RAM 12, and the thick arrows indicate transmission and reception of data through the communication passage 26 discussed above.

As illustrated in FIG. 2, the image forming apparatus 2 includes, as components on the first system 8 side, a log reading section 32, a second log storage section 34, a log transmission request notification section 36, a response reception section 40, a log reception section 44, a third log storage section 46, a completion information reception section 50, a completion information storage section 52, and a state notification reception section 58. The image forming apparatus 2 also includes, as components on the second system 14 side, a first log storage section 30, a log transmission request response section 38, a log transmitting section 42, a print completion information notification section 48, an abnormality detection section 54, and a state notification section 56.

The first log storage section 30 stores a log (history data) of operation performed under control by the second system 14 in the shared memory area of the RAM 12. The first log storage section 30 stores a log in the RAM 12 any time when a log is generated, for example.

The log reading section 32 reads the log stored in the RAM 12 by the first log storage section 30 at a timing determined in advance.

The second log storage section 34 stores the log read by the log reading section 32 in the HDD 18.

The log transmission request notification section 36 transmits a command, which is a notification requesting transmission of a log of operation performed under control by the second system 14, to the second system 14 via the communication passage 26.

The log transmission request response section 38 responds via the communication passage 26 to the notification requesting transmission of a log in the case where the notification is received from the first system 8. In the exemplary embodiment, the log transmission request response section 38 responds to the notification by providing the first system 8 with a message indicating whether or not there is any log to be transmitted.

The response reception section 40 receives via the communication passage 26 a response from the second system 14 to the notification transmitted by the log transmission request notification section 36. In the case where the response reception section 40 does not receive a response from the second system 14 within a time determined in advance, it is determined that an abnormality is caused in the second system 14 or the communication passage 26.

The log transmitting section 42 transmits a log of operation performed under control by the second system 14 to the first system 8 via the communication passage 26 in the case where there is any log to be transmitted.

The log reception section 44 receives the log transmitted from the second system 14 via the communication passage 26.

The third log storage section 46 stores the log received by the log reception section 44 in the HDD 18.

The print completion information notification section 48 provides print completion information including information on a printed page to the first system 8 via the communication passage 26 each time printing of a page is completed. Examples of the information on a printed page include print conditions for the page and the page number of the page.

The completion information reception section 50 receives the print completion information from the second system 14 via the communication passage 26. In the case where there is a problem with the print completion information received by the completion information reception section 50, it is determined that an abnormality is caused in the second system 14. For example, it is determined that an abnormality is caused in the second system 14 in the case where the print completion information includes print conditions that are different from print conditions according to an instruction provided from the first system 8 to the second system 14, or in the case where the print completion information includes information indicating that a page that is different from a designated page has been printed.

The completion information storage section 52 stores the print completion information received by the completion information reception section 50 in the HDD 18.

The abnormality detection section 54 detects an abnormality caused in the second system 14.

The state notification section 56 notifies the first system 8 of the state of the second system 14 via the communication passage 26. For example, the state notification section 56 notifies the first system 8 that the second system 14 is in an abnormal state in the case where an abnormality of the second system 14 is detected by the abnormality detection section 54.

The state notification reception section 58 receives information indicating the state of the second system 14 provided from the second system 14 via the communication passage 26.

Using the configuration described above, the image forming apparatus 2 stores a log of operation performed under control by the second system 14 in a non-volatile storage medium (HDD 18). In the exemplary embodiment, in the case where the image forming apparatus 2 is waiting for an instruction to execute a process (in a stand-by state), log data are transferred from the log transmitting section 42 to the log reception section 44, and the third log storage section 46 stores the log in the HDD 18. In the case where the image forming apparatus 2 is executing a process such as outputting an image (in an operating state), meanwhile, a log is delivered from the first log storage section 30 to the log reading section 32 via the RAM 12, and the second log storage section 34 stores the log in the HDD 18. In the case where an abnormality is caused in the second system 14, or in the case where communication through the communication passage 26 is impossible, in addition, a log is delivered from the first log storage section 30 to the log reading section 32 via the RAM 12, and the second log storage section 34 stores the log in the HDD 18.

Communication through the communication passage 26 imposes a large processing load on the first system 8 and the second system 14 compared to access to the RAM 12.

Therefore, in the case where the image forming apparatus 2 is in the operating state, it is desirable that transfer of a log by communication through the communication passage 26 should be reduced not to affect a process being executed. Meanwhile, transfer of a log by communication through the communication passage 26 allows an abnormality of the second system 14 to be detected by monitoring the response status of the second system 14, which makes it possible to check the state of the second system 14.

Next, the flow of storage of a log of operation performed under control by the second system 14 in a non-volatile storage medium will be described.

Figure 3:
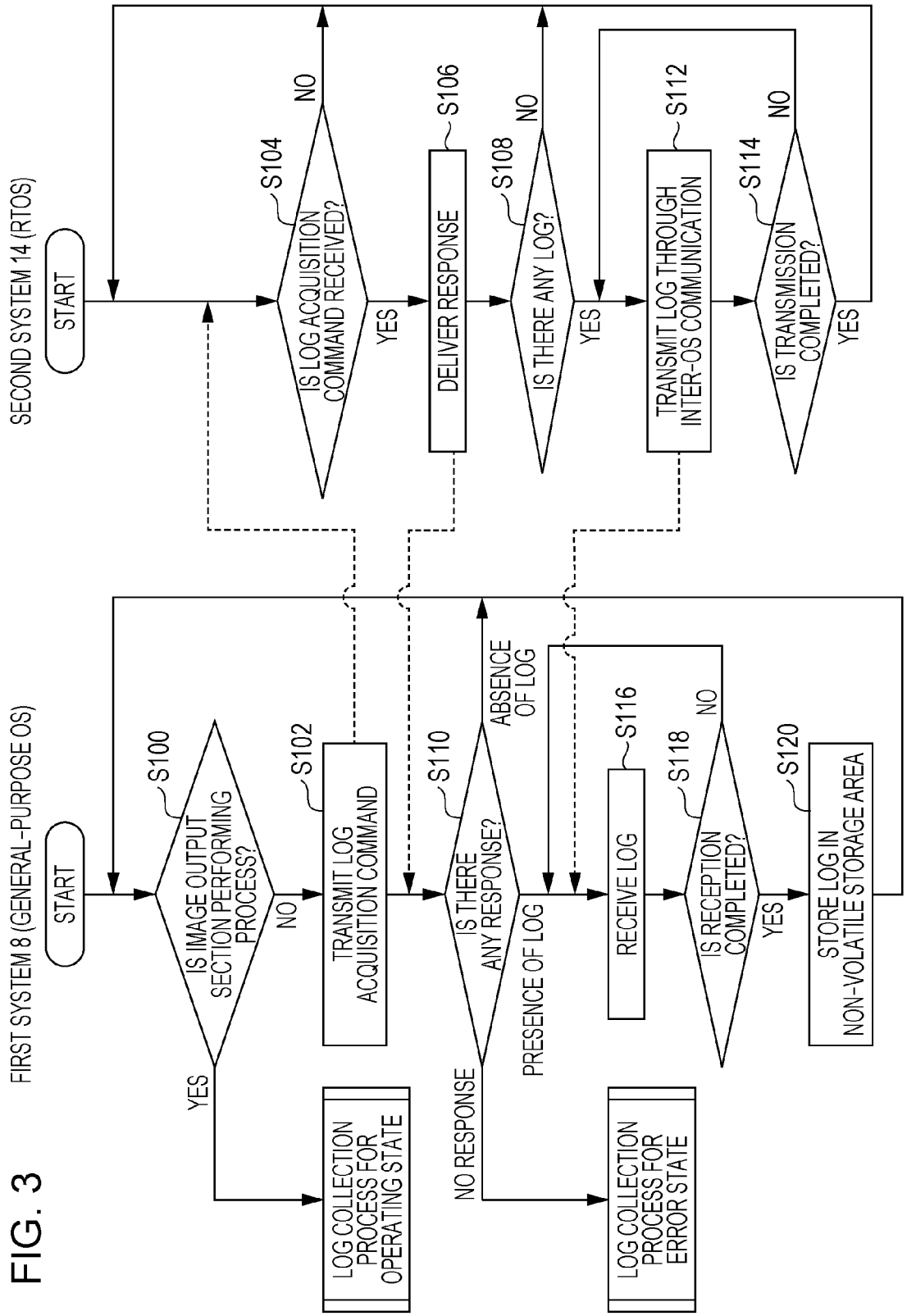
FIG. 3 is a flowchart illustrating the flow of log storage with the image forming apparatus 2 in a stand-by state.

FIG. 3 is a flowchart illustrating the flow of log storage with the image forming apparatus 2 in the stand-by state. Here, it is determined that the image forming apparatus 2 is in the stand-by state in the case where the image output section 22 is not performing a process.

In step S100, it is determined whether or not the image output section 22 is performing a process. In the case where the image output section 22 is not performing a process, the process proceeds to step S102. Step S102 will be described here in order to describe the flow of log storage for a case where the image forming apparatus 2 is in the stand-by state. In the case where the image output section 22 is performing a process, however, it is determined that the image forming apparatus 2 is in the operating state, and the process proceeds to the flowchart illustrated in FIG. 4.

In step S102, on the first system 8 side, the log transmission request notification section 36 transmits a command for acquiring a log to the second system 14.

In step S104, on the second system 14 side, it is determined whether or not the command from the first system 8 side is received. In the case where the command for acquiring a log is received from the first system 8 side, the process proceeds to step S106. In the case where the command is not received, the second system 14 waits for the command to be received.

In step S106, on the second system 14 side, the log transmission request response section 38 notifies the first system 8 side of the presence or absence of any log to be transmitted. After that, in the case where there is any log to be transmitted (Yes in step S108), the process proceeds to step S112. In the case where there is not any log to be transmitted (No in step S108), the process returns to step S104.

In step S110, on the first system 8 side, it is determined whether or not there is any response from the second system 14 side to the command transmitted in step S102. In the case where there is not any response within a time determined in advance, it is determined that an abnormality is caused in the second system 14 or the communication passage 26, and the process proceeds to the flowchart illustrated in FIG. 5. In the case where there is a response indicating the presence of a log from the second system 14 side, meanwhile, the process proceeds to step S116. In the case where there is a response indicating the absence of a log, the process returns to step S100.

In step S112, on the second system 14 side, the log transmitting section 42 transmits a log to the first system 8 via the communication passage 26.

In step S114, on the second system 14 side, it is determined whether or not all the logs to be transmitted are transmitted. In the case where there remains any log to be transmitted, the process returns to step S112. In the case where transmission of the logs is completed, the process returns to step S104.

In step S116, on the first system 8 side, the log reception section 44 receives the log transmitted from the second system 14 via the communication passage 26.

In step S118, on the first system 8 side, it is determined whether or not reception of the log is completed. In the case where reception of the log is completed, the process proceeds to step S120. In the case where reception of the log is not completed, the process returns to step S116.

In step S120, on the first system 8 side, the third log storage section 46 stores the log received in step S118 in the HDD 18. The log may be stored in the HDD 18 after all the logs are received in step S116, or each time a log is received.

Figure 4:
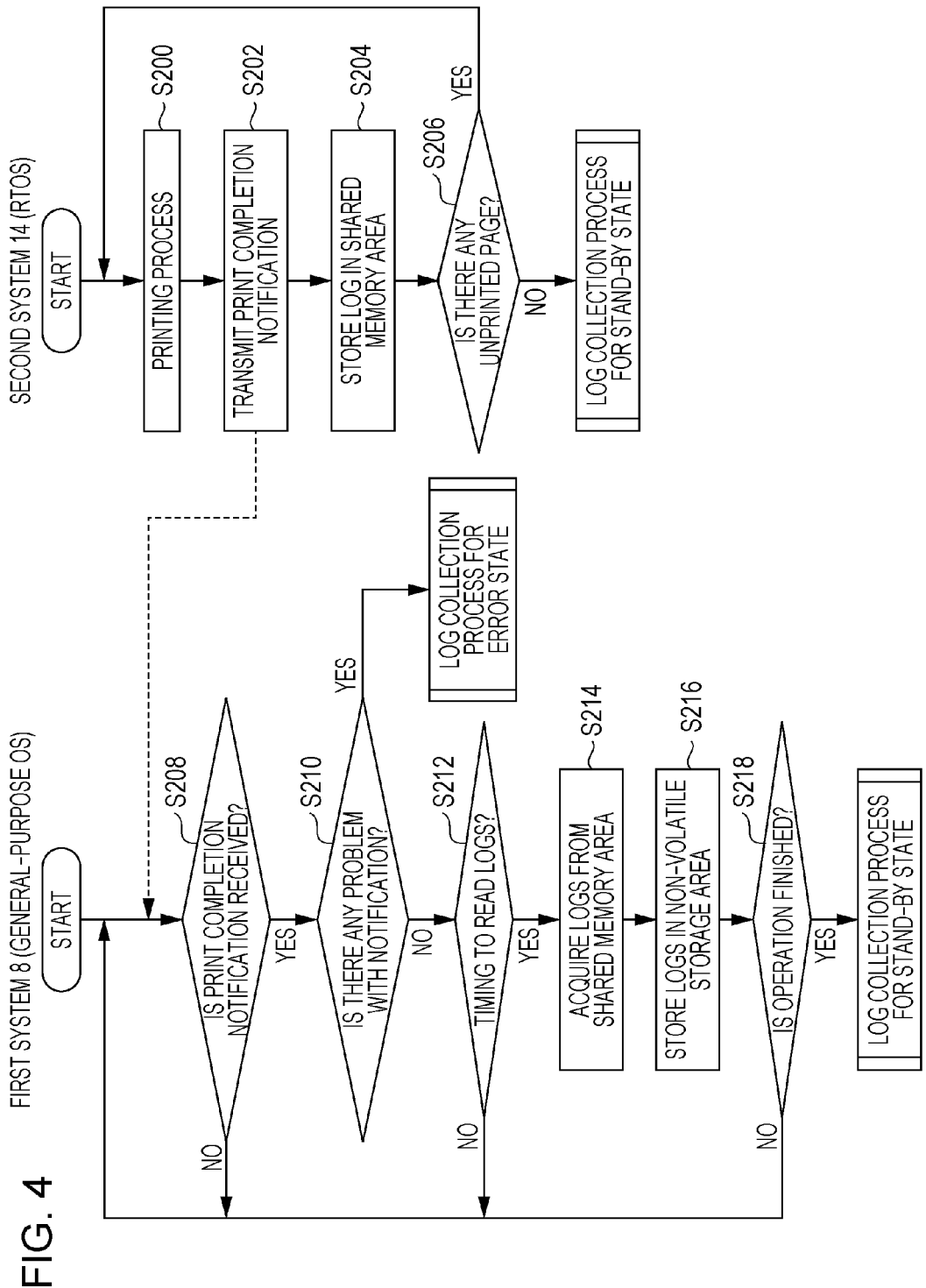
FIG. 4 is a flowchart illustrating the flow of log storage with the image forming apparatus 2 in an operating state.

FIG. 4 is a flowchart illustrating the flow of log storage with the image forming apparatus 2 in the operating state.

In step S200, the image output section 22 prints a page under control by the second system 14.

In step S202, on the second system 14 side, when printing of a page is finished in step S200, the print completion information notification section 48 provides print completion information to the second system 14 via the communication passage 26.

In step S204, on the second system 14 side, the first log storage section 30 stores a log in the shared memory area of the RAM 12.

In step S206, on the second system 14 side, it is determined whether or not there is any unprinted page. In the case where there is any unprinted page, the process returns to step S200 to continue printing. In the case where there is not any unprinted page, on the other hand, the process proceeds to the flowchart for the stand-by state illustrated in FIG. 3.

On the first system 8 side, on the other hand, it is determined in step S208 whether or not the completion information reception section 50 receives the print completion information transmitted from the second system 14. In the case where the print completion information is received, the process proceeds to step S210. In the case where the print completion information is not received, the first system 8 waits for the print completion information to be received.

In step S210, on the first system 8, it is checked whether there is any problem with the print completion information received by the completion information reception section 50. In the case where there is any problem, the process proceeds to the flowchart illustrated in FIG. 5. In the case where there is not any problem, the process proceeds to step S212.

In step S212, on the first system 8 side, it is determined whether or not the timing to read the logs from the shared memory area of the RAM 12 has arrived. In the case where the timing to read the logs has arrived, the process proceeds to step S214. In the case where the timing to read the logs has not arrived, the process returns to step S208. The logs may be read at intervals of a time determined in advance, for example.

In step S214, on the first system 8 side, the log reading section 32 reads the logs from the shared memory area of the RAM 12 to acquire the logs.

In step S216, on the first system 8 side, the second log storage section 34 stores the logs read in step S214 in the HDD 18.

In step S218, it is determined whether or not the image output section 22 is performing a process. In the case where the image output section 22 is performing a process, it is determined that the image forming apparatus 2 is in the operating state, and the process returns to step S208. In the case where a process is finished, the process proceeds to the flowchart for the stand-by state illustrated in FIG. 3.

Figure 5:
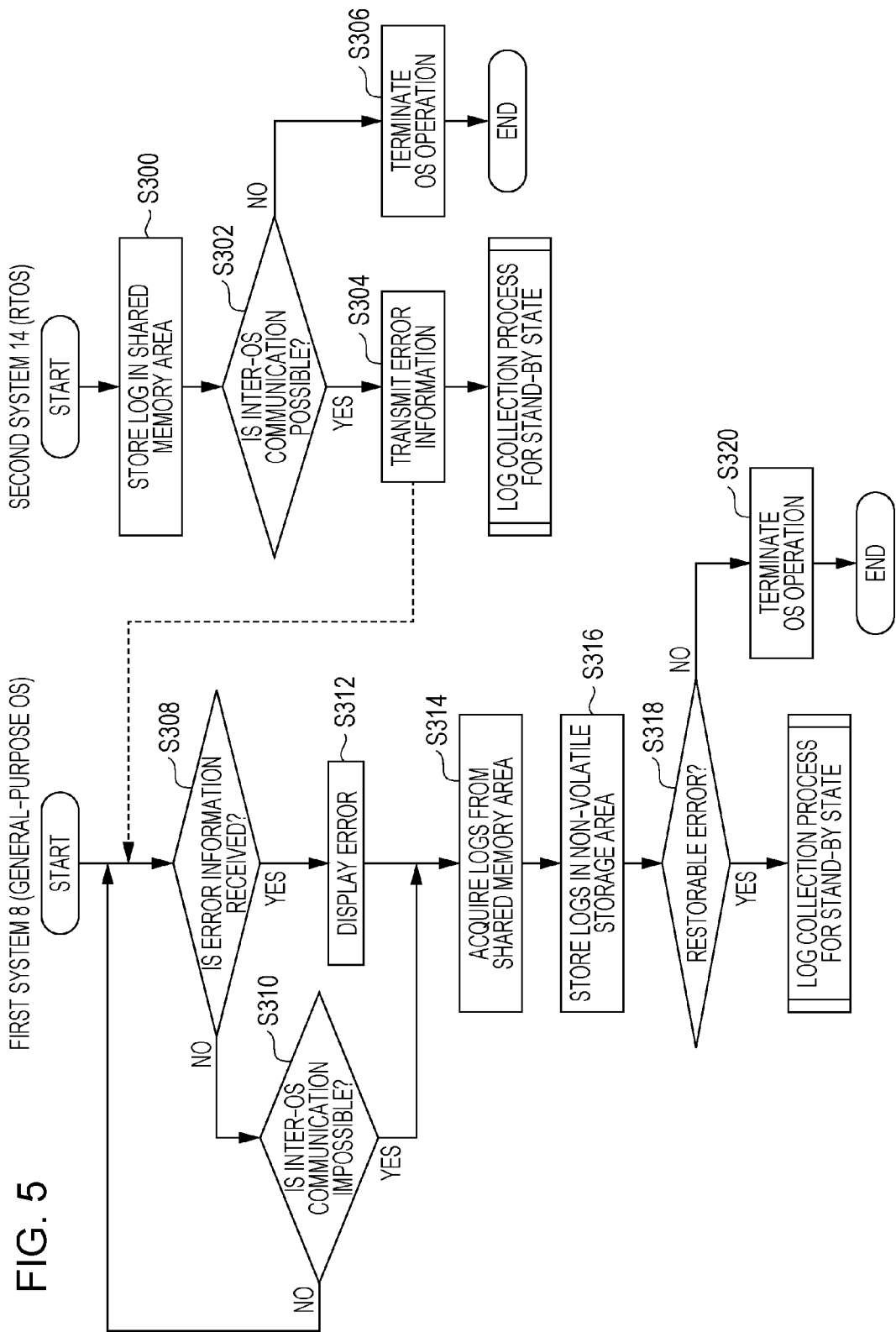
FIG. 5 is a flowchart illustrating the flow of log storage with the second system 14 in an abnormal state.

FIG. 5 is a flowchart illustrating the flow of log storage with the second system 14 in an abnormal state.

In step S300, on the second system 14 side, when the abnormality detection section 54 detects an abnormality of the second system 14, the first log storage section 30 stores a log in the shared memory area of the RAM 12.

In step S302, on the second system 14 side, it is determined whether or not communication through the communication passage 26 is possible. In the case where communication through the communication passage 26 is possible, the process proceeds to step S304. In the case where communication through the communication passage 26 is not possible, the process proceeds to step S306.

In step S304, on the second system 14 side, the state notification section 56 notifies the first system 8 of an error. After that, the process proceeds to the flowchart for the stand-by state illustrated in FIG. 3.

In step S306, meanwhile, the second system 14 terminates operation of the OS. Power supply to the RAM 12 is not stopped even if operation of the OS is terminated in the second system 14.

On the first system 8 side, meanwhile, it is determined in step S308 whether or not the state notification reception section 58 receives error information from the second system 14. In the case where error information is received, the process proceeds to step S312. In the case where error information is not received, the process proceeds to step S310.

In step S310, on the first system 8 side, it is determined whether or not communication through the communication passage 26 is possible. In the case where communication through the communication passage 26 is possible, the process returns to step S308. In the case where communication through the communication passage 26 is not possible, the process proceeds to step S314. The communication state of the communication passage 26 is checked in step S310 at intervals of a time determined in advance, for example. The communication state of the communication passage 26 may be checked in accordance with the presence or absence of any response received by the response reception section 40.

In step S312, the content of an error is displayed on the UI section 20 on the basis of the received error information.

In step S314, on the first system 8 side, the log reading section 32 reads the logs from the shared memory area of the RAM 12 to acquire the logs.

In step S316, on the first system 8 side, the second log storage section 34 stores the logs read in step S314 in the HDD 18.

In step S318, it is determined whether not the abnormality of the second system 14 is an abnormality determined in advance to be restorable. In the case where the abnormality is restorable, the process proceeds to the flowchart for the stand-by state illustrated in FIG. 3. In the case where the abnormality is not restorable, the process proceeds to step S320, and the first system 8 terminates operation of the OS.

In the example illustrated in FIG. 5, the log is delivered via the RAM 12 irrespective of whether or not communication through the communication passage 26 is possible. In the case where communication through the communication passage 26 is possible, however, the log may be transferred via the communication passage 26.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a first controller;
   a second controller;
   a non-volatile storage medium provided to be able to store data under control by the first controller and provided to be unable to store data under control by the second controller; and
   a volatile storage medium which is provided to be able to store data under control by the second controller and from which the data are readable under control by the first controller,
   wherein the second controller includes a first storage unit that stores history data of operation performed under control by the second controller in the volatile storage medium, and
   the first controller includes
      a reading unit that reads the history data stored in the volatile storage medium by the first storage unit, and
      a second storage unit that stores the history data read by the reading unit in the non-volatile storage medium.

2. The information processing apparatus according to claim 1, further comprising:
   a communication passage that transmits and receives data between the first controller and the second controller,
   wherein the first controller further includes
      a transmission request notification unit that provides a notification requesting transmission of the history data to the second controller via the communication passage,
      a response reception unit that receives a response from the second controller to the notification provided by the transmission request notification unit via the communication passage,
      a history data reception unit that receives the history data transmitted from the second controller via the communication passage, and
      a third storage unit that stores the history data received by the history data reception unit in the non-volatile storage medium,
   the second controller further includes
      a responding unit that responds to the notification requesting transmission of the history data via the communication passage in the case where the notification is received from the first controller, and
      a history data transmitting unit that transmits the history data of operation performed under control by the second controller to the first controller via the communication passage, and
   the third storage unit stores the history data in the non-volatile storage medium in the case where the apparatus is waiting for an instruction to execute a process.

3. The information processing apparatus according to claim 1,
   wherein the second controller further includes an abnormality notification unit that notifies the first controller that an abnormality is caused when an abnormality is caused in the second controller.

4. A non-transitory computer readable medium storing a program causing a computer of an information processing apparatus, which includes a first controller, a second controller, a non-volatile storage medium provided to be able to store data under control by the first controller and provided to be unable to store data under control by the second controller, and a volatile storage medium which is provided to be able to store data under control by the second controller and from which the data are readable under control by the first controller, to perform a process comprising:
 causing the second controller to store history data of operation performed under control by the second controller in the volatile storage medium;
 causing the first controller to read history data stored in the volatile storage medium; and
 causing the first controller to store the read history data in the non-volatile storage medium.

\* \* \* \* \*